(12) United States Patent
Thondapilly Balakrishnan et al.

(10) Patent No.: US 12,373,310 B2
(45) Date of Patent: Jul. 29, 2025

(54) BACKUP RECOVERY FROM REMOTE STORAGE

(71) Applicant: HEWLETT PACKARD ENTERPRISE DEVELOPMENT LP, Houston, TX (US)

(72) Inventors: Sijesh Thondapilly Balakrishnan, Karnataka (IN); Aswin Jayaraman, Karnataka (IN); Sankar Ramasamy, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/933,579

(22) Filed: Sep. 20, 2022

(65) Prior Publication Data

US 2024/0095132 A1    Mar. 21, 2024

(51) Int. Cl.
*G06F 11/00* (2006.01)
*G06F 11/14* (2006.01)

(52) U.S. Cl.
CPC ................................ *G06F 11/1469* (2013.01)

(58) Field of Classification Search
None
See application file for complete search history.

(56) References Cited

U.S. PATENT DOCUMENTS

| | | | |
|---|---|---|---|
| 7,778,958 B2 * | 8/2010 | Rand | G06F 11/1469 707/610 |
| 9,009,430 B2 * | 4/2015 | Augenstein | G06F 11/1469 711/E12.103 |
| 10,268,695 B2 * | 4/2019 | Belmanu Sadananda | G06F 16/1756 |
| 10,387,073 B2 * | 8/2019 | Bhagi | G06F 3/0664 |
| 10,635,545 B1 | 4/2020 | Bono et al. | |
| 10,635,546 B2 * | 4/2020 | Karthikeyan | G06F 3/065 |
| 10,684,924 B2 * | 6/2020 | Kilaru | G06F 11/2097 |
| 10,732,881 B1 | 8/2020 | Mayo et al. | |
| 10,776,210 B2 | 9/2020 | Slater et al. | |
| 10,802,928 B2 * | 10/2020 | Matsui | G06F 11/1469 |
| 11,182,081 B2 | 11/2021 | Brown et al. | |
| 11,249,864 B2 * | 2/2022 | Bhagi | G06F 3/0619 |
| 11,288,135 B2 * | 3/2022 | Karthikeyan | G06F 11/1448 |

(Continued)

FOREIGN PATENT DOCUMENTS

| CN | 103778034 A | 5/2014 |
|---|---|---|
| CN | 113742810 A | 12/2021 |

*Primary Examiner* — Farhan M Syed
(74) *Attorney, Agent, or Firm* — Trop, Pruner & Hu, P.C.

(57) ABSTRACT

Example implementations relate to backup operations in a storage system. An example includes a medium storing instructions to: detect a trigger event to initiate a backup restoration of a data entity at a local storage system; determine a user preference between a speed priority and a cost priority; based at least on the determined user preference, select between: an indirect restoration option in which a first portion of the backup data stored on the remote storage system is combined with a second portion of backup data stored on a gateway device to restore the data entity at the local storage system; and a direct restoration option in which the backup data stored on the remote storage system is restored at the local storage system without being combined with other backup data; and restore, using the selected first restoration option, the data entity at the local storage system.

20 Claims, 12 Drawing Sheets

(56) References Cited

U.S. PATENT DOCUMENTS

| | | | |
|---|---|---|---|
| 11,531,602 B2* | 12/2022 | Kilaru | G06F 11/2094 |
| 11,604,706 B2* | 3/2023 | Nara | G06F 11/1461 |
| 11,669,414 B2* | 6/2023 | Bhagi | G06F 3/065 |
| | | | 711/162 |
| 2011/0161723 A1* | 6/2011 | Taleck | G06F 11/1469 |
| | | | 714/E11.073 |
| 2017/0242871 A1* | 8/2017 | Kilaru | G06F 11/2094 |
| 2017/0293531 A1 | 10/2017 | Watkins et al. | |
| 2017/0300505 A1* | 10/2017 | Belmanu Sadananda | |
| | | | G06F 11/14 |
| 2017/0329543 A1* | 11/2017 | Slater | G06F 11/00 |
| 2019/0179714 A1* | 6/2019 | Karthikeyan | G06F 3/065 |
| 2020/0210294 A1* | 7/2020 | Karthikeyan | G06F 3/064 |
| 2020/0356451 A1* | 11/2020 | Kilaru | G06F 11/2097 |
| 2021/0157680 A1* | 5/2021 | LeCrone | G06F 11/1464 |
| 2022/0229736 A1* | 7/2022 | Karthikeyan | G06F 11/1464 |
| 2022/0245034 A1* | 8/2022 | Nara | G06F 11/1469 |
| 2022/0382647 A1* | 12/2022 | Lewis | G06F 11/1435 |
| 2023/0289264 A1* | 9/2023 | Nara | G06F 11/1461 |

* cited by examiner

Machine Readable Storage Medium
900

910
Detect a trigger event to initiate a backup restoration of a data entity at a local storage system, where backup data of the data entity is stored on a remote storage system

920
In response to a detection of the trigger event, determine a user preference between speed priority and cost priority

930
Based at least on the determined user preference, select between: an indirect restoration option in which a first portion of the backup data stored on the remote storage system is combined with a second portion of backup data stored on a gateway device and the combined portions are used to restore the data entity at the local storage system; and
a direct restoration option in which the backup data stored on the remote storage system is restored at the local storage system without being combined with other backup data from the gateway device

940
Restore, using the selected first restoration option, the data entity at the local storage system

FIG. 9

BACKUP RECOVERY FROM REMOTE STORAGE

BACKGROUND

A computer system may store data in local storage of the computer system. In some examples, the data may also be stored in a remote data backup system that is in communication with the computer system. In such examples, the data may be retrieved from the data backup system when the data is lost, corrupted, or otherwise becomes inaccessible at the local storage of the computer system, for example.

BRIEF DESCRIPTION OF THE DRAWINGS

Some implementations are described with respect to the following figures.

FIG. 9 is a diagram of an example machine-readable medium storing instructions in accordance with some implementations.

Figure 1:
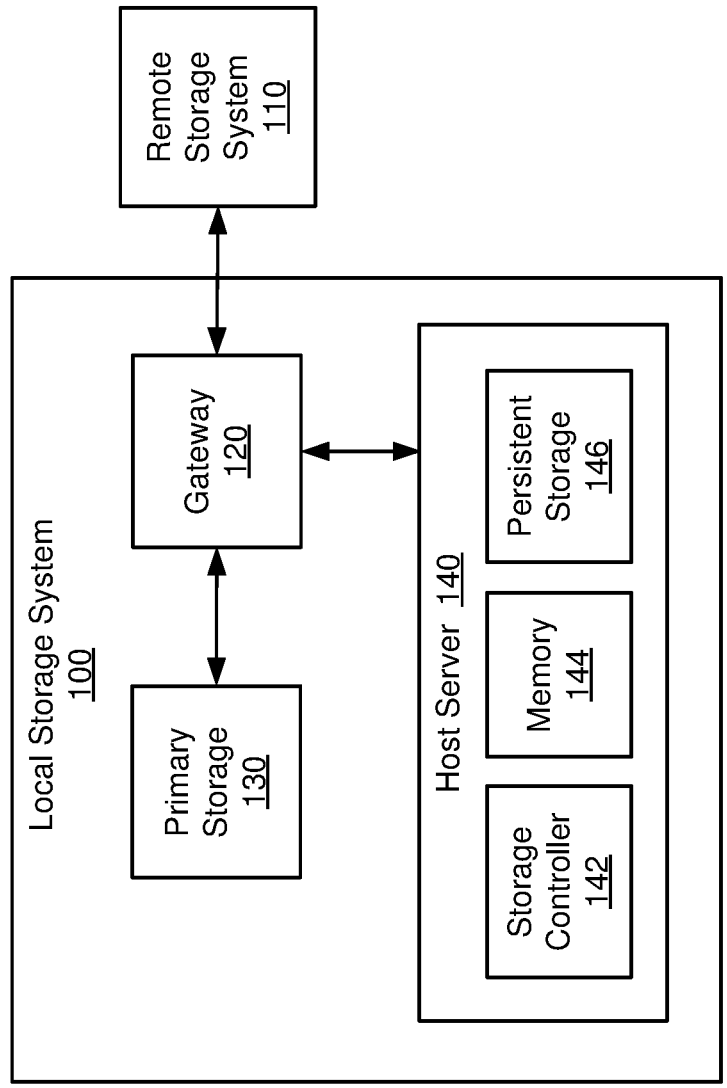
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a deduplication storage system may deduplicate data to reduce the amount of space required to store the data. The deduplication storage system may perform a deduplication process including breaking a stream of data into discrete data units (or "chunks") and determining "fingerprints" (described below) for these incoming data units. Further, the deduplication storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the deduplication storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a "local storage system" may mount or load one or more volumes of data storage. Each volume may be a defined portion of storage that may be accessed via unique address or identifier (e.g., a physical storage drive, a virtual storage container, etc.). Further, each volume may include smaller data objects (also referred to herein as "sub-volume" objects). For example, such sub-volume objects may include a file, a database, a virtual machine, and so forth. As used herein, the term "data entities" may refer to volumes, sub-volume objects, or any combination thereof.

In some examples, a duplicate version of a data entity may be generated to serve as a backup copy of the data entity. For example, a local storage system may generate a copy of all data blocks in a particular data entity (e.g., in deduplicated form), which may be referred to herein as a "full backup" of the data entity. Subsequently, the local storage system may generate another copy of the particular data entity that includes only those data blocks of the data entity that have changed since the prior backup, which may be referred to herein as an "incremental backup" of the data entity. Further, the local storage system may continue generating additional incremental backups of the data entity at different points in time.

In some examples, the local storage system may recreate the data entity as it existed at a specific point in time based on the full backup and a sequence of incremental backups. Specifically, the local storage system may recreate the data from the full backup, and may also recreate the data from each following incremental backup until reaching the incremental backup corresponding to the specific point in time. In this manner, the changes that were made to the data entity may be accumulated in order until reaching the state of the data entity as it existed at the desired point in time.

In some examples, for disaster recovery purposes (such as when a failure results in data loss, whether partial or complete) or for recovery from other events (such as power loss or fault during a write or store operation), the backup copies of data entities of the local storage system may be stored in a "remote storage system" that is in a different physical location than the local storage system. For example, the remote storage system may be provided by a cloud storage service provider. In some examples, the remote storage system may store data entities at the volume level (i.e., as whole volumes). Further, in some examples, the remote storage system may store data entities in deduplicated form.

When there is a need to restore all or a portion of a data entity stored in the remote storage system (e.g., to recover from a failure event), the required backup data may be transferred from the remote storage system to the local storage system, and may be used by the local storage system to restore the data entity. In some examples, there may be multiple alternative processes for transferring and restoring the backup data (referred to herein as "restoration options"). The restoration options may differ in the time needed to complete a restoration, and in the amount of data that is transferred for the restoration. In some examples, the data transfers from the remote storage system may incur financial charges that are based on the amount of data being transferred. Therefore, the selection of a particular restoration option may affect the overall financial cost of the restoration.

In accordance with some implementations of the present disclosure, a local storage system may select one of multiple restoration options for transferring and restoring data from a remote storage system. As discussed further below with reference to FIGS. 1-9, the restoration option may be selected based on an evaluation of multiple input values. For example, in some implementations, the input values may include the type of data entity (e.g., volume or sub-volume) to be restored, information about any portions or earlier copies of the desired data entity that may be stored in the local storage system, and a value indicating a user preference between cost priority and speed priority (e.g., a relative importance of lower financial cost versus faster completion). In some implementations, the local storage system may select the restoration option that can perform the restoration with a relatively low cost and an acceptable time of completion. In this manner, some implementations may improve the performance of the local storage system when restoring backup data from the remote storage system.

In some implementations, the restoration options may include at least one process for restoring a data entity that is a volume (referred to herein as "volume restoration"). Further, the restoration options may include at least one process for restoring a data entity that is a sub-volume object (referred to herein as "sub-volume restoration"). For example, a sub-volume restoration option may be implemented using the Element Recovery Technology (ERT) provided by the Hewlett Packard Enterprise Company.

In some implementations, the restoration options may include at least one process for restoring a data entity that is stored on the remote storage system as full backup (referred to herein as "full restoration"). Further, the restoration options may include at least one process for restoring a data entity that is stored on the remote storage system as an incremental backup (referred to herein as "incremental restoration").

In some implementations, the restoration options may include at least one restoration option (referred to herein as a "direct restoration" option) involving transferring the entirety of the backup data directly from the remote storage system to the local storage system. Further, the restoration options may include at least one restoration option (referred to herein as an "indirect restoration" option) involving transferring a portion of the backup data from the remote storage system to a gateway device that is interposed between the target host device and the remote storage system, and combining the transferred backup portion with a remaining backup portion that is stored on the gateway device. In some implementations, using an indirect restoration option may incur less financial cost than using a direct restoration option.

FIG. 1—Example Storage System

FIG. 1 shows an example implementation including a local storage system 100 and a remote storage system 110. In some implementations, the local storage system 100 may be coupled to the remote storage system 110 via a network connection. The remote storage system 110 may be a network-based storage facility or service (also referred to herein as "cloud-based storage"). In some examples, use of the remote storage system 110 may incur financial charges that are based on size and/or quantity of data transfers.

As shown in FIG. 1, the local storage system 100 may include a host server 140, primary storage 130, and a gateway 120. The host server 140 may include a storage controller 142, memory 144, and persistent storage 146, in accordance with some implementations. The persistent storage 146 may include non-transitory storage media such as hard disk drives (HDDs), solid state drives (SSDs), optical disks, and so forth, or a combination thereof. The memory 144 may be implemented in semiconductor memory such as random access memory (RAM). In some examples, the storage controller 142 may be implemented via hardware (e.g., electronic circuitry) or a combination of hardware and programming (e.g., comprising at least one processor and instructions executable by the at least one processor and stored on at least one machine-readable storage medium).

In some implementations, the gateway 120 may be a device providing management and/or acceleration of data transfers between the local storage system 100 and the remote storage system 110. In some implementations, the gateway 120 may be implemented as a hardware device including various components (e.g., controller, memory, persistent storage) similar to those included in the host server 140. However, in other implementations, the gateway 120 may be implemented in software (e.g., as a virtual machine) executed by a processor (e.g., the storage controller 142, another processor included in the remote storage system 110, another processor included in another external computing device, and so forth).

In some implementations, the storage controller 142 may determine whether there is a current need to restore a data entity from a backup copy on the remote storage system 110. For example, the storage controller 142 may detect a failure event in the local storage system 100 (e.g., a power failure, a device failure, etc.) that causes the loss of all or a portion of a database that is needed for performing business operations (e.g., an inventory database). Upon determining that there is a need to restore the data entity, the storage controller 142 may select one of multiple restoration options for transferring and restoring the data entity from the remote storage system 110. Examples of restoration options are discussed below with reference to FIGS. 3A-5B.

In some implementations, the storage controller 142 may evaluate multiple input values to select a particular restoration option for the needed restoration. For example, a first input value may indicate the type of data entity to be restored (e.g., a volume type or a sub-volume type). A second input value may indicate a user preference between cost priority and speed priority (e.g., a relative importance of lower financial cost versus faster completion). Further, other input value(s) may include information regarding any portions or earlier copies of the desired data entity that may be stored in the local storage system 100 (e.g., in host server 140, in primary storage 130, in gateway 120, etc.). Furthermore, different input values may be used in some implementations.

In some implementations, the storage controller 142 may select a restoration option based on the evaluation of multiple input values. For example, the storage controller 142 may evaluate an input value to determine that the current user prioritizes cost over speed, and may therefore assign a greater importance to reduced financial cost (as opposed to speed of completion) in selecting a restoration option. Example processes for selecting a restoration option are discussed below with reference to FIGS. 3A-5B.

Figure 2:
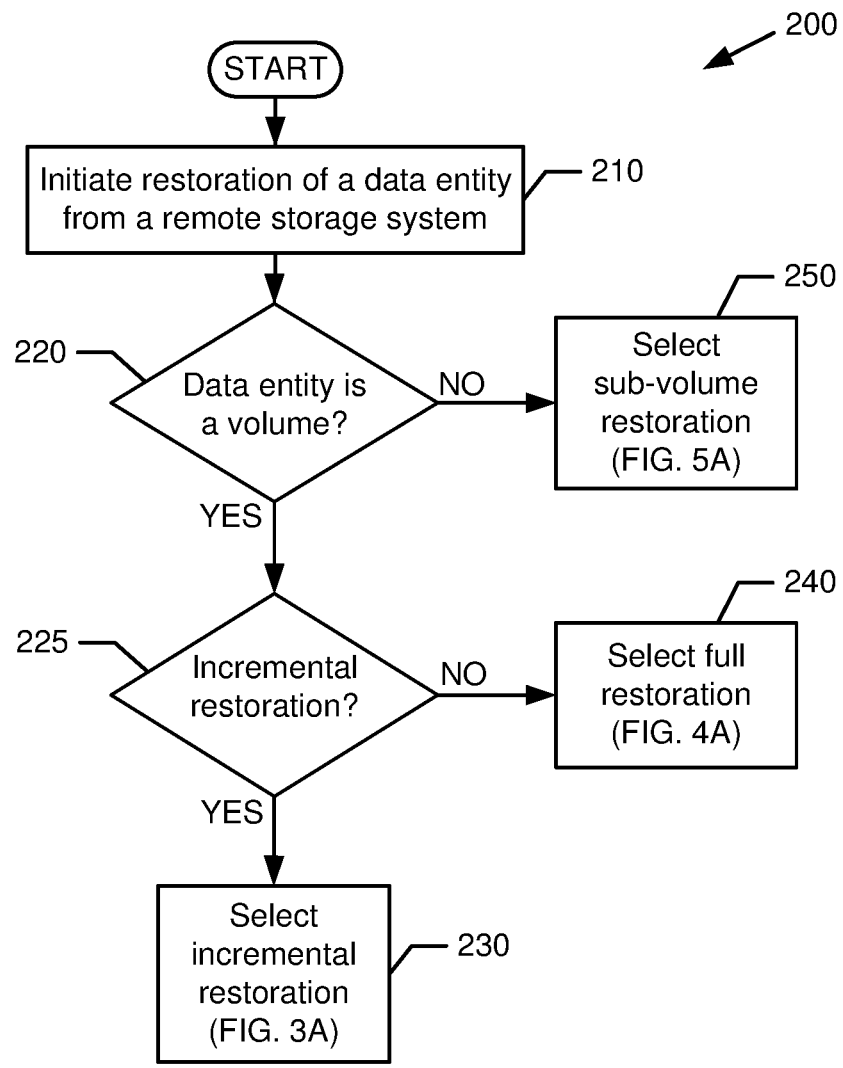
FIG. 2 is an illustration of an example process, in accordance with some implementations.

FIG. 2—Example Process for Selecting a Restoration Option

FIG. 2 shows is an example process 200 for selecting a restoration option, in accordance with some implementations. The process 200 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 200 may be described below with reference to FIG. 1, which shows an example implementation. However, other implementations are also possible.

Referring to FIG. 2, block 210 may include initiating the restoration of a data entity from a remote storage system. Decision block 220 may include determining whether the data entity to be restored is a volume. For example, referring to FIG. 1, the storage controller 142 detects a failure event in the local storage system 100 that causes the loss of all or a portion of a data entity, and in response initiates a restoration of the data entity from the remote storage system 110. In another example, the storage controller 142 receives a backup restore request for a data entity stored on a remote storage system (e.g., from a user, an application, or any other entity). Further, the storage controller 142 determines whether the data entity is a volume or a sub-volume object.

Figure 5A:
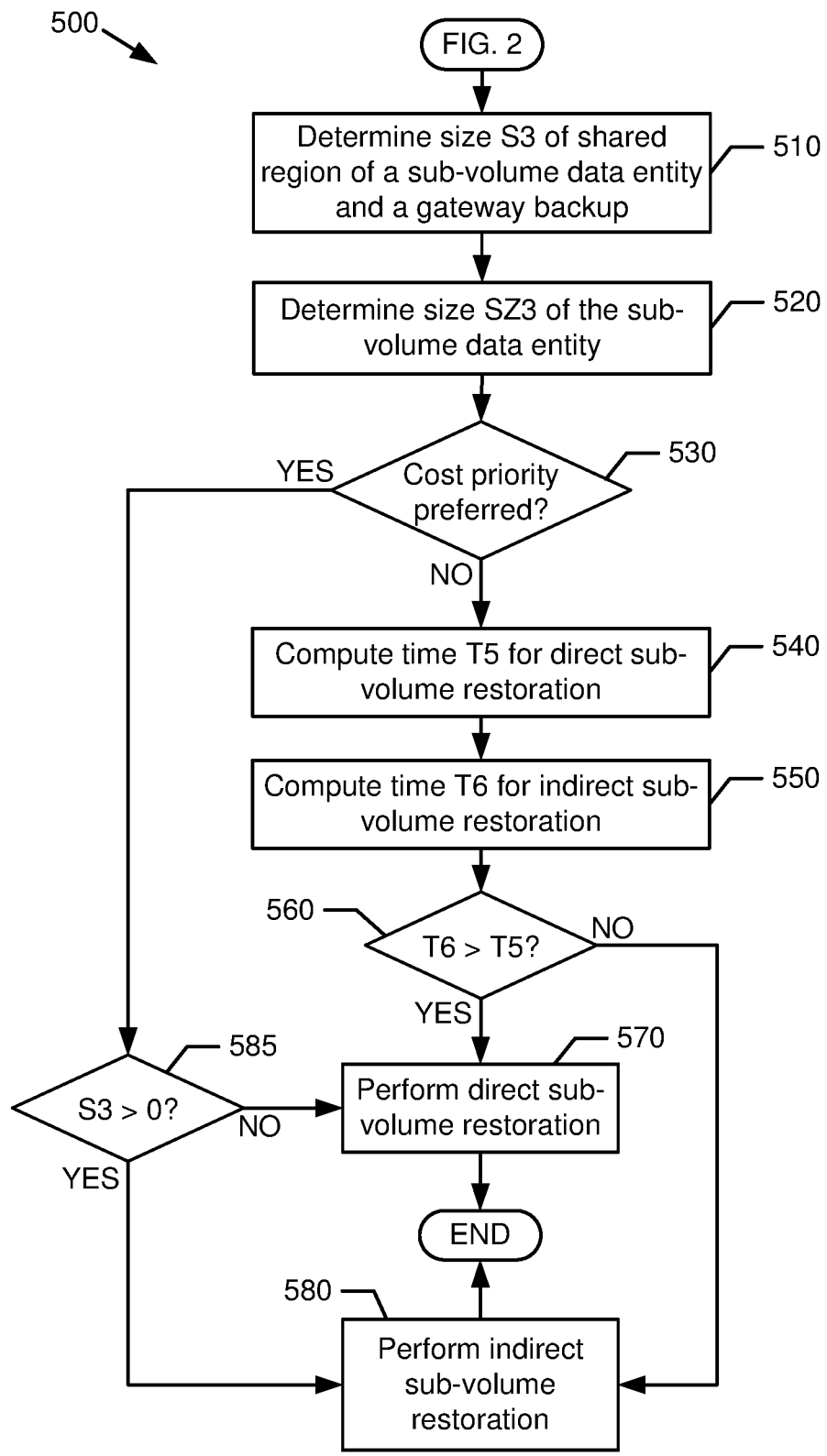
FIGS. 5A-5B are illustrations of an example process and system, in accordance with some implementations.

Referring again to FIG. 2, if it is determined at decision block 220 that the data entity to be restored is not a volume ("NO"), the process 200 may continue at block 250, including selecting a sub-volume restoration option. In some implementations, a sub-volume restoration option may be used to restore a sub-volume object (i.e., a data entity included in a volume that may be stored in a backup). For example, a sub-volume restoration option may be performed to restore a file system, a file, a database, a virtual machine, and so forth. An example process for selecting a sub-volume option is shown in FIG. 5A (discussed below).

However, if it is determined at decision block 220 that the data entity to be restored is a volume ("YES"), the process 200 may continue at decision block 225, including determining whether an incremental restoration can be performed for the data entity. If so ("YES"), the process 200 may continue at block 230, including selecting an incremental restoration option. An example process for selecting an incremental restoration option is shown in FIG. 3A (discussed below).

In some implementations, it may be determined that an incremental restoration can be performed if an earlier full backup of the data entity is stored in the local storage system. For example, referring to FIG. 1, the storage controller 142 determines that the data entity to be restored is a volume as it existed at the time of its most recent backup. Further, the storage controller 142 determines that the most recent backup of the volume is stored as an incremental backup on the remote storage system 110, and that an earlier full backup (i.e., a full copy of the volume as it existed at a time that is prior to most recent backup) is stored in the local storage system (e.g., in host server 140, in primary storage 130, in gateway 120, etc.). Accordingly, in this example, it is determined that an incremental restoration can be performed by combining the incremental backup with the full backup, such that the changed data blocks in the incremental backup replace the corresponding (i.e., original) data blocks in the full backup.

Figure 4A:
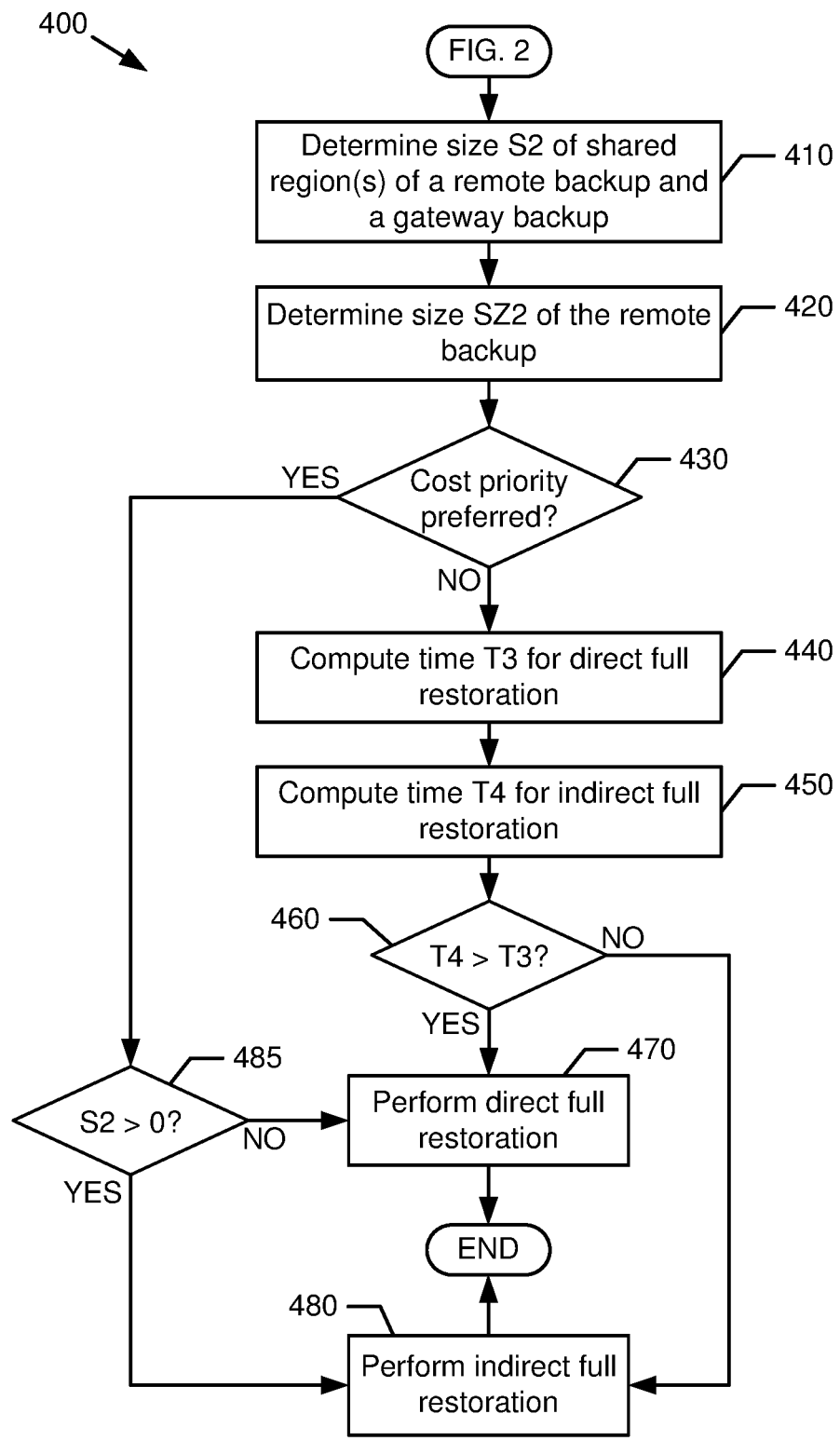
FIGS. 4A-4B are illustrations of an example process and system, in accordance with some implementations.

Referring again to FIG. 2, if it is determined at decision block 225 that an incremental restoration cannot be performed for the data entity ("NO"), the process 200 may continue at block 240, including selecting a full restoration option. In some implementations, a full restoration option may be used to restore a data entity that is stored on the remote storage system as full backup. An example process for selecting a full restoration option is shown in FIG. 4A (discussed below).

Figure 3A:
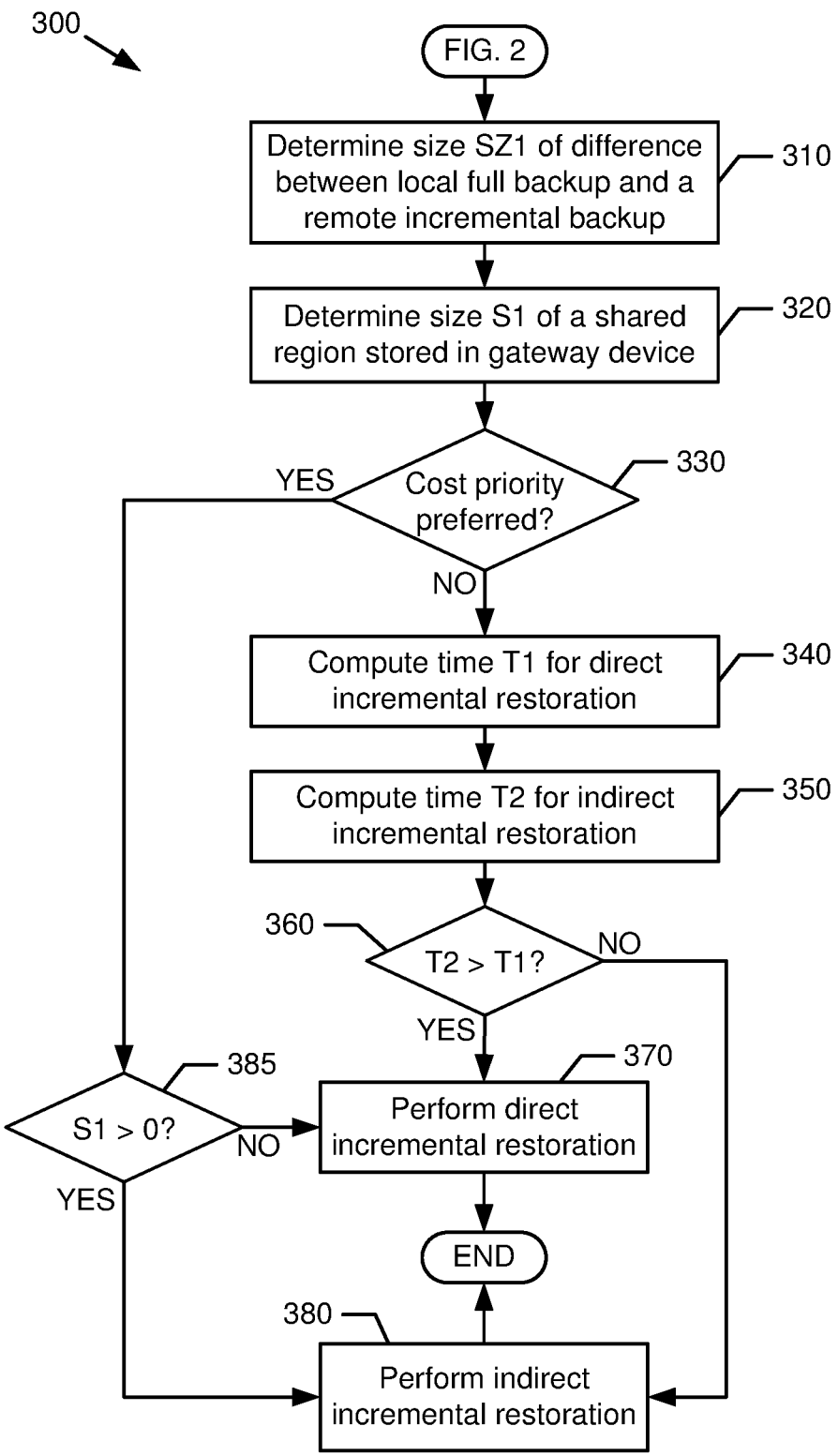
FIGS. 3A-3B are illustrations of an example process and system, in accordance with some implementations.
Figure 3B:
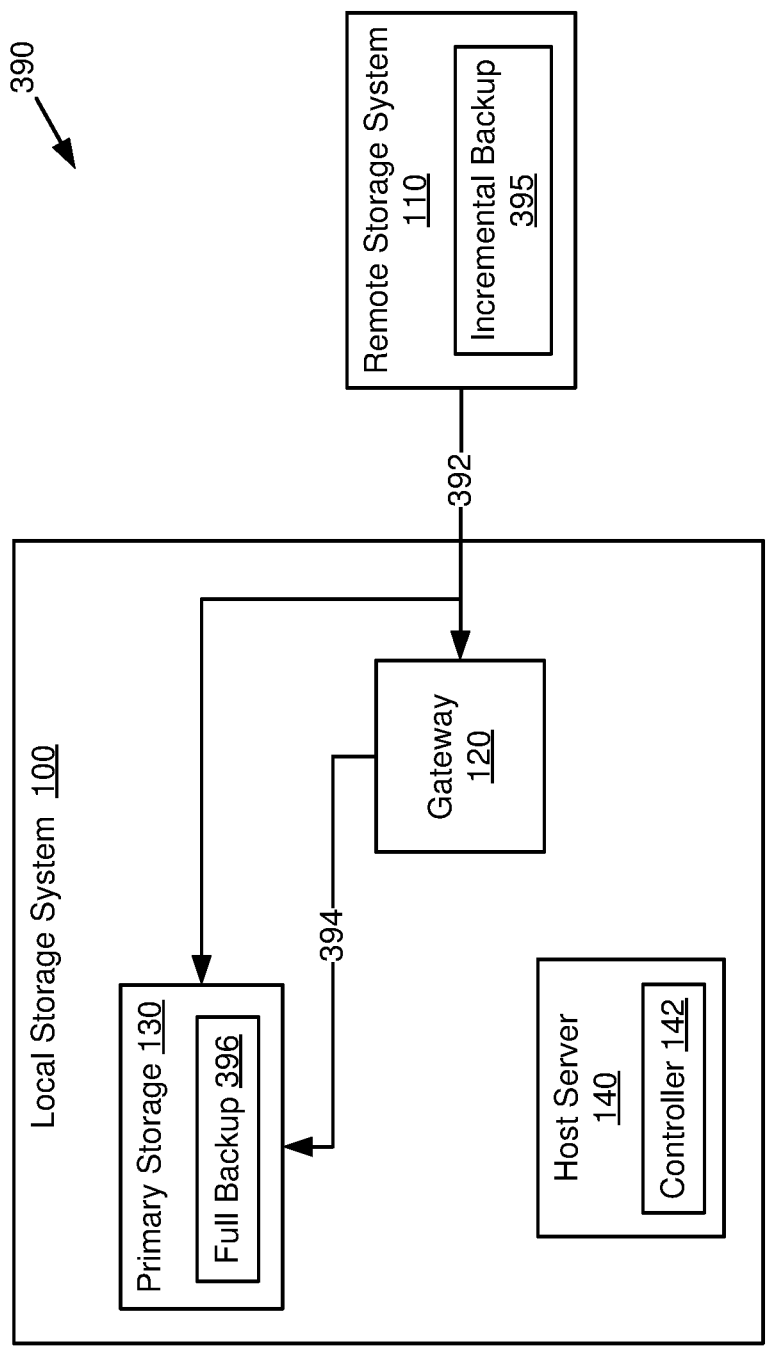

FIGS. 3A-3B—Example Process for Selecting an Incremental Restoration Option

FIG. 3A shows is an example process 300 for selecting an incremental restoration option, in accordance with some implementations. The process 300 may illustrate an example expansion of block 230 (shown in FIG. 2). For the sake of illustration, details of the process 300 may be described below with reference to FIG. 3B, which shows an example system 390. However, other implementations are also possible. The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth (e.g., storage controller 142 shown in FIG. 1).

Referring now to FIG. 3A, block 310 may include determining the size SZ1 of the difference between a local full backup and a remote incremental backup. Block 320 may include determining the size S1 of any shared region stored in a gateway device. For example, referring to FIG. 3B, an earlier full backup 396 is stored in the primary storage 130 of the local storage system 100, and a later incremental backup 395 is stored in the remote storage system 110. The storage controller 142 determines which data units (if any) in the incremental backup 395 are different from the data units in the full backup 396 (referred to herein as the "delta" between the backups), and determines the total size SZ1 of this delta between the full and incremental backups. Further, the storage controller 142 determines which data units (if any) included in the delta are also stored in a storage of the gateway 120 (referred to herein as the "shared region"), and determines the total size S1 of this shared region stored in the gateway 120.

Referring again to FIG. 3A, decision block 330 may include determining whether a user prefers a cost priority over a speed priority (i.e., a lower financial cost is more important a faster completion). If not ("NO"), the process 300 may continue at block 340, including computing an approximate time T1 for completing a direct incremental restoration. For example, referring to FIG. 3B, the storage controller 142 determines the network throughput TH1 (e.g., maximum bandwidth) of the link 394 between the gateway 120 and the primary storage 130. Further, the storage controller 142 determines the network throughput TH2 of the link 392 between the remote storage system 110 and the local storage system 100. In some implementations, the network throughput TH2 may represent the maximum bandwidth of data transfers from the remote storage system 110 to one or more components of the local storage system 100 (e.g., gateway 120, primary storage 130, and/or host server 140).

The storage controller 142 estimates the time T1 to complete a direct incremental restoration using the formula T1=SZ1/TH2 (i.e., the total size SZ1 of the delta between the full and incremental backups divided by the network throughput TH2 of the link 392). Stated differently, the time T1 to complete a direct incremental restoration may be estimated as the time required to transfer the delta from the remote storage system 110 to the primary storage 130 of the local storage system 100 (i.e., without being processed by the gateway 120).

Referring again to FIG. 3A, block 350 may include computing an approximate time T2 for completing an indirect incremental restoration. For example, referring to FIG. 3B, the storage controller 142 determines the size D1 of the backup portion to be transferred from the remote storage system 110 to the gateway 120 using the formula D1=SZ1−S1 (i.e., the size SZ1 of the delta between the full and incremental backups minus the size S1 of the shared region stored in the gateway 120).

The storage controller 142 estimates the time T2a to transfer the backup portion from the remote storage system 110 to the gateway 120 using the formula T2a=D1/TH2 (i.e., the size D1 of the backup portion to be transferred divided by the network throughput TH2 of the link 392).

Further, the storage controller 142 estimates the time T2b to transfer the delta from the gateway 120 to the primary storage 130 using the formula T2b=SZ1/TH1 (i.e., the total size SZ1 of the delta divided by the network throughput TH1 of the link 394).

Furthermore, the storage controller 142 computes the approximate time T2 to complete an indirect incremental restoration using the formula T2=T2a+T2b (i.e., the sum of the time T2a to transfer the backup portion from the remote storage system 110 to the gateway 120 plus the time T2b to transfer the delta from the gateway 120 to the primary storage 130).

Referring again to FIG. 3A, decision block 360 may include determining whether the time T2 (i.e., time to complete an indirect incremental restoration) is greater than the time T1 (i.e., time to complete a direct incremental restoration). If so ("YES"), the process 300 may continue at block 370, including performing a direct incremental restoration. Otherwise, if the time T2 is not greater than the time T1 ("NO"), the process 300 may continue at block 380, including performing an indirect incremental restoration. After block 370 or block 380, the process 300 may be completed. For example, referring to FIG. 3B, if the time T2 to complete an indirect incremental restoration is greater that the time T1 to complete a direct incremental restoration, the storage controller 142 selects a direct incremental restoration option to be executed to restore the data entity. Otherwise (i.e., if T2 is not greater than T1), the storage controller 142 selects an indirect incremental restoration option to be executed to restore the data entity.

Referring again to FIG. 3A, if it is determined at decision block 330 that a user prefers a cost priority over a speed priority ("YES"), the process 300 may continue at decision block 385, including determining whether the size S1 of any shared region stored in a gateway device is greater than zero. If not ("NO"), the process 300 may continue at block 370, including performing a direct incremental restoration. Otherwise, if the size S1 of a shared region is greater than zero ("YES"), the process 300 may continue at block 380, including performing an indirect incremental restoration. For example, referring to FIG. 3B, the storage controller 142 determines whether the gateway 120 stores a shared region (i.e., data units that are also included in the delta between the full and incremental backups). The storage controller 142 performs a direct incremental restoration if the gateway 120 does not store a shared region, and performs an indirect incremental restoration if the gateway 120 does store a shared region.

Figure 4B:
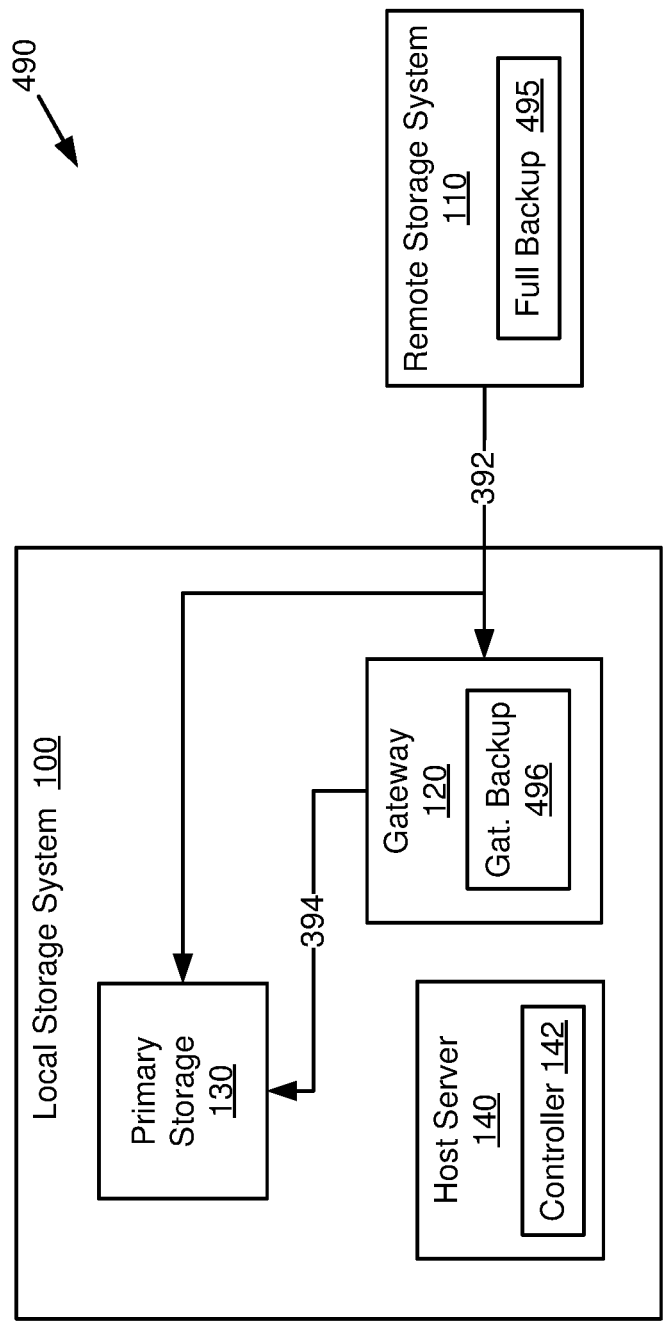

FIGS. 4A-4B—Example Process for Selecting a Full Restoration Option

FIG. 4A shows is an example process 400 for selecting a full restoration option, in accordance with some implementations. The process 400 may illustrate an example expansion of block 240 (shown in FIG. 2). For the sake of illustration, details of the process 400 may be described below with reference to FIG. 4B, which shows an example system 490. However, other implementations are also possible. The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth (e.g., storage controller 142 shown in FIG. 1).

Referring now to FIG. 4A, block 410 may include determining the size S2 of a shared region of a remote backup and a gateway backup. Block 420 may include determining the size SZ2 of the remote backup. For example, referring to FIG. 4B, a full backup 495 is stored in the remote storage system 110, and is a complete backup copy in the state needed for the restoration of the data entity. Further, a gateway backup 496 is stored in the gateway 120, and may include a portion (or none) of the data units required for the restoration of the data entity. The storage controller 142 determines if any data units (referred to herein as a "shared region") are included in both the full backup 495 and the gateway backup 496, and determines the total size S2 of this shared region. Further, the storage controller 142 determines the total size SZ2 of the full backup 495 stored in the remote storage system 110. The total size SZ2 only includes the sizes of the portions of the full backup 495 that are required to be transferred from the remote storage system 110 to the local storage system 100.

Referring again to FIG. 4A, decision block 430 may include determining whether a user prefers a cost priority over a speed priority. If not ("NO"), the process 400 may continue at block 440, including computing an approximate time T3 for completing a direct full restoration. For example, referring to FIG. 4B, the storage controller 142 determines the network throughput TH1 of the link 394 between the gateway 120 and the primary storage 130. Further, the storage controller 142 determines the network throughput TH2 of the link 392 between the remote storage system 110 and the local storage system 100. The storage controller 142 estimates the time T3 to complete a direct full restoration using the formula T3=SZ2/TH2 (i.e., the total size SZ2 of the full backup 495 divided by the network throughput TH2 of the link 392). Stated differently, the time T3 to complete a direct full restoration may be estimated as the time required to transfer the full backup 495 (having size SZ2) from the remote storage system 110 to the primary storage 130 of the local storage system 100 (i.e., without being processed by the gateway 120).

Referring again to FIG. 4A, block 450 may include computing an approximate time T4 for completing an indirect full restoration. For example, referring to FIG. 4B, the storage controller 142 determines the size D2 of the backup portion to be transferred from the remote storage system 110 to the gateway 120 using the formula D2=SZ2−S2 (i.e., the size SZ2 of the full backup 495 minus the size S2 of the shared region of the full backup 495 and the gateway backup 496).

The storage controller 142 estimates the time T4a to transfer the backup portion from the remote storage system 110 to the gateway 120 using the formula T4a=D2/TH2 (i.e., the size D2 of the backup portion to be transferred divided by the network throughput TH2 of the link 392).

Further, the storage controller 142 estimates the time T4b to transfer the full backup from the gateway 120 to the primary storage 130 using the formula T4b=SZ2/TH1 (i.e., the size SZ2 of the full backup 495 divided by the network throughput TH1 of the link 394).

Furthermore, the storage controller 142 computes the approximate time T4 to complete an indirect full restoration using the formula T4=T4a+T4b (i.e., the sum of the time T4a to transfer the backup portion from the remote storage system 110 to the gateway 120 plus the time T4b to transfer the full backup 495 from the gateway 120 to the primary storage 130).

Referring again to FIG. 4A, decision block 460 may include determining whether the time T4 (i.e., time to complete an indirect full restoration) is greater than the time T3 (i.e., time to complete a direct full restoration). If so ("YES"), the process 400 may continue at block 470, including performing a direct full restoration. Otherwise, if the time T4 is not greater than the time T3 ("NO"), the process 400 may continue at block 480, including performing an indirect full restoration. After block 470 or block 480, the process 400 may be completed. For example, referring to FIG. 4B, if the time T4 to complete an indirect full restoration is greater that the time T3 to complete a direct full restoration, the storage controller 142 selects a direct full restoration option to be executed to restore the data entity. Otherwise (i.e., if T4 is not greater than T3), the storage controller 142 selects an indirect full restoration option to be executed to restore the data entity.

Referring again to FIG. 4A, if it is determined at decision block 430 that a user prefers a cost priority over a speed priority ("YES"), the process 400 may continue at decision block 485, including determining whether the size S2 of any shared regions of the full backup and the gateway backup is greater than zero. If not ("NO"), the process 400 may continue at block 470, including performing a direct full restoration. Otherwise, if the size S2 of any shared regions is greater than zero ("YES"), the process 400 may continue at block 480, including performing an indirect full restoration. For example, referring to FIG. 4B, the storage controller 142 determines whether there is any shared region of the full backup 495 and the gateway backup 496 (i.e., there are any data units that are present in both the full backup 495 and the gateway backup 496). The storage controller 142 performs an indirect full restoration if any shared regions exist, and performs a direct full restoration if no shared regions exist.

Figure 5B:
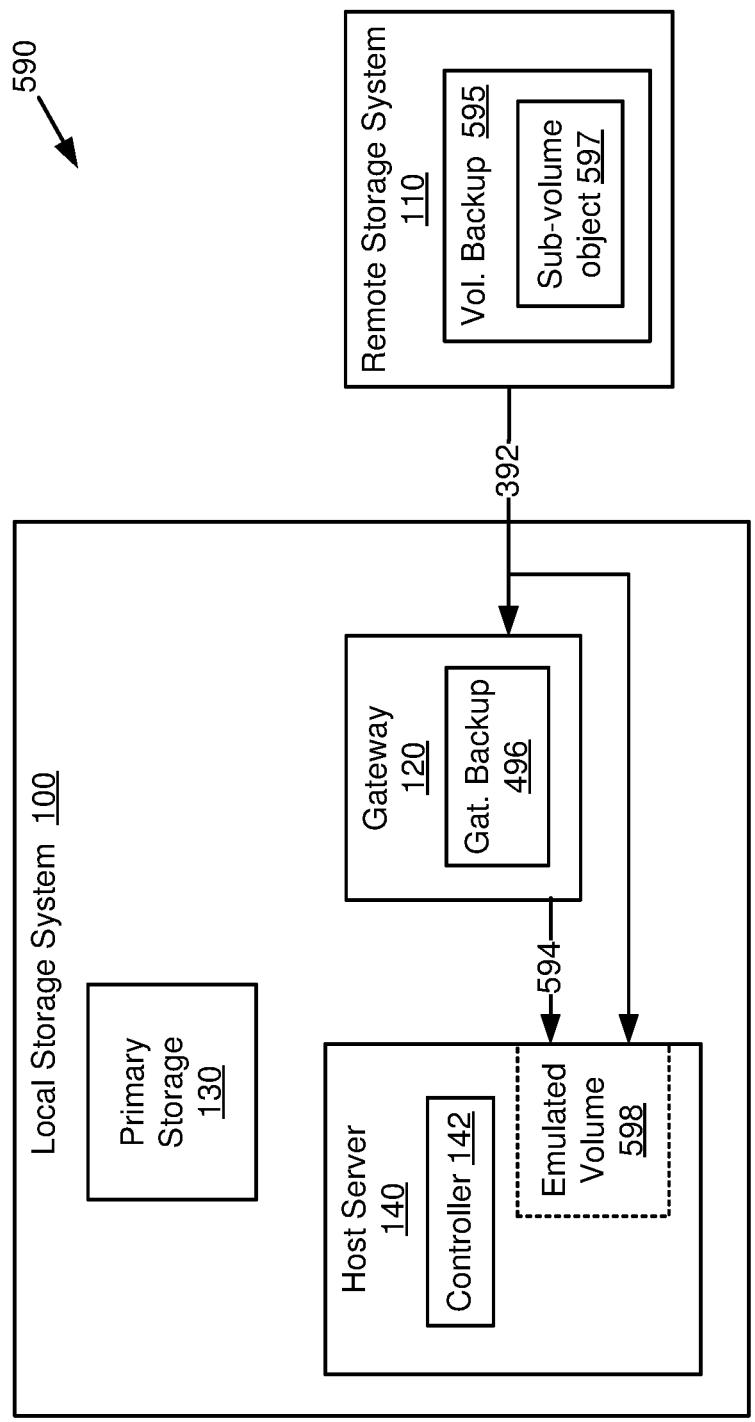

FIGS. 5A-5B—Example Process for Selecting a Sub-Volume Restoration Option

FIG. 5A shows is an example process 500 for selecting a sub-volume restoration option, in accordance with some implementations. The process 500 may illustrate an example expansion of block 250 (shown in FIG. 2). For the sake of illustration, details of the process 500 may be described below with reference to FIG. 5B, which shows an example system 590. However, other implementations are also possible. The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth (e.g., storage controller 142 shown in FIG. 1).

Referring now to FIG. 5A, block 510 may include determining the size S3 of a shared region of a sub-volume data entity and a remote backup. Block 520 may include determining the size SZ3 of the sub-volume data entity. For example, referring to FIG. 5B, a volume backup 595 is stored in the remote storage system 110, and includes a sub-volume object 597. The sub-volume object 597 is a full copy of the target data entity (i.e., the sub-volume data entity to be restored). Further, a gateway backup 496 is stored in the gateway 120, and may include a portion (or none) of the data units required for the restoration of the target data entity. The storage controller 142 determines a shared region including any data units that may be shared by the sub-volume object 597 and the gateway backup 496, and determines the total size S3 of this shared region. Further, the storage controller 142 determines the total size SZ3 of the sub-volume object 597 included in the volume backup 595.

Referring again to FIG. 5A, decision block 530 may include determining whether a user prefers a cost priority over a speed priority. If not ("NO"), the process 500 may continue at block 540, including computing an approximate time T5 for completing a direct sub-volume restoration. For example, referring to FIG. 5B, the storage controller 142 determines the network throughput TH2 of the link 392 between the remote storage system 110 and the local storage system 100. Further, the storage controller 142 determines the network throughput TH3 of the link 594 between the gateway 120 and the host server 140. The storage controller 142 estimates the time T5 to complete a direct sub-volume restoration using the formula T5=SZ3/TH2 (i.e., the total size SZ3 of the sub-volume object 597 divided by the network throughput TH2 of the link 392). Stated differently, the time T5 to complete a direct sub-volume restoration may be estimated as the time required to transfer the sub-volume object 597 from the remote storage system 110 to the primary storage 130 of the local storage system 100 (i.e., without being processed by the gateway 120).

Referring again to FIG. 5A, block 550 may include computing an approximate time T6 for completing an indirect sub-volume restoration. For example, referring to FIG. 5B, the storage controller 142 determines the size D3 of the backup portion to be transferred from the remote storage system 110 to the gateway 120 using the formula D3=SZ3−S3 (i.e., the size SZ3 of the sub-volume object 597 minus the size S3 of the shared region of the sub-volume object 597 and the gateway backup 496).

The storage controller 142 estimates the time T5a to transfer the backup portion from the remote storage system 110 to the gateway 120 using the formula T5a=D3/TH2 (i.e., the size D3 of the backup portion to be transferred divided by the network throughput TH2 of the link 392).

Further, the storage controller 142 estimates the time T5b to transfer the sub-volume object from the gateway 120 to the primary storage 130 using the formula T5b=SZ3/TH3 (i.e., the size SZ3 of the sub-volume object 597 divided by the network throughput TH3 of the link 594 between the gateway 120 and the host server 140).

Furthermore, the storage controller 142 computes the approximate time T5 to complete an indirect sub-volume restoration using the formula T5=T5a+T5b (i.e., the sum of the time T5a to transfer the backup portion from the remote storage system 110 to the gateway 120 plus the time T5b to transfer the sub-volume object 597 from the gateway 120 to the host server 140).

Referring again to FIG. 5A, decision block 560 may include determining whether the time T6 (i.e., time to complete an indirect sub-volume restoration) is greater than the time T5 (i.e., time to complete a direct sub-volume restoration). If so ("YES"), the process 500 may continue at block 570, including performing a direct sub-volume restoration. Otherwise, if the time T6 is not greater than the time T5 ("NO"), the process 500 may continue at block 580, including performing an indirect sub-volume restoration. After block 570 or block 580, the process 500 may be completed. For example, referring to FIG. 5B, if the time T6 to complete an indirect sub-volume restoration is greater that the time T5 to complete a direct sub-volume restoration, the storage controller 142 selects a direct sub-volume restoration option to be executed to restore the target data entity. Otherwise (i.e., if T6 is not greater than T5), the storage controller 142 selects an indirect sub-volume restoration option to be executed to restore the target data entity.

Referring again to FIG. 5A, if it is determined at decision block 530 that a user prefers a cost priority over a speed priority ("YES"), the process 500 may continue at decision block 585, including determining whether the size S3 of the shared region of the sub-volume object and the gateway backup is greater than zero. If not ("NO"), the process 500 may continue at block 570, including performing a direct sub-volume restoration. Otherwise, if the size S3 of the shared region is greater than zero ("YES"), the process 500 may continue at block 580, including performing an indirect sub-volume restoration. For example, referring to FIG. 5B, the storage controller 142 determines whether there is any shared region of the sub-volume object 597 and the gateway backup 496 (i.e., there are any data units that are present in both the sub-volume object 597 and the gateway backup 496). The storage controller 142 performs an indirect sub-volume restoration if any shared regions exist, and performs a direct sub-volume restoration if no shared regions exist. In some implementations, performing either an indirect sub-volume restoration or a direct sub-volume restoration may allow the host server 140 to access the restored sub-volume object as an emulated volume 598. For example, the emulated volume 598 may be a simulated or "virtual" volume that is mounted on a file system of the host server 140, and which includes the data contents of the restored sub-volume (e.g., a file, a database, and so forth).

Figure 6:
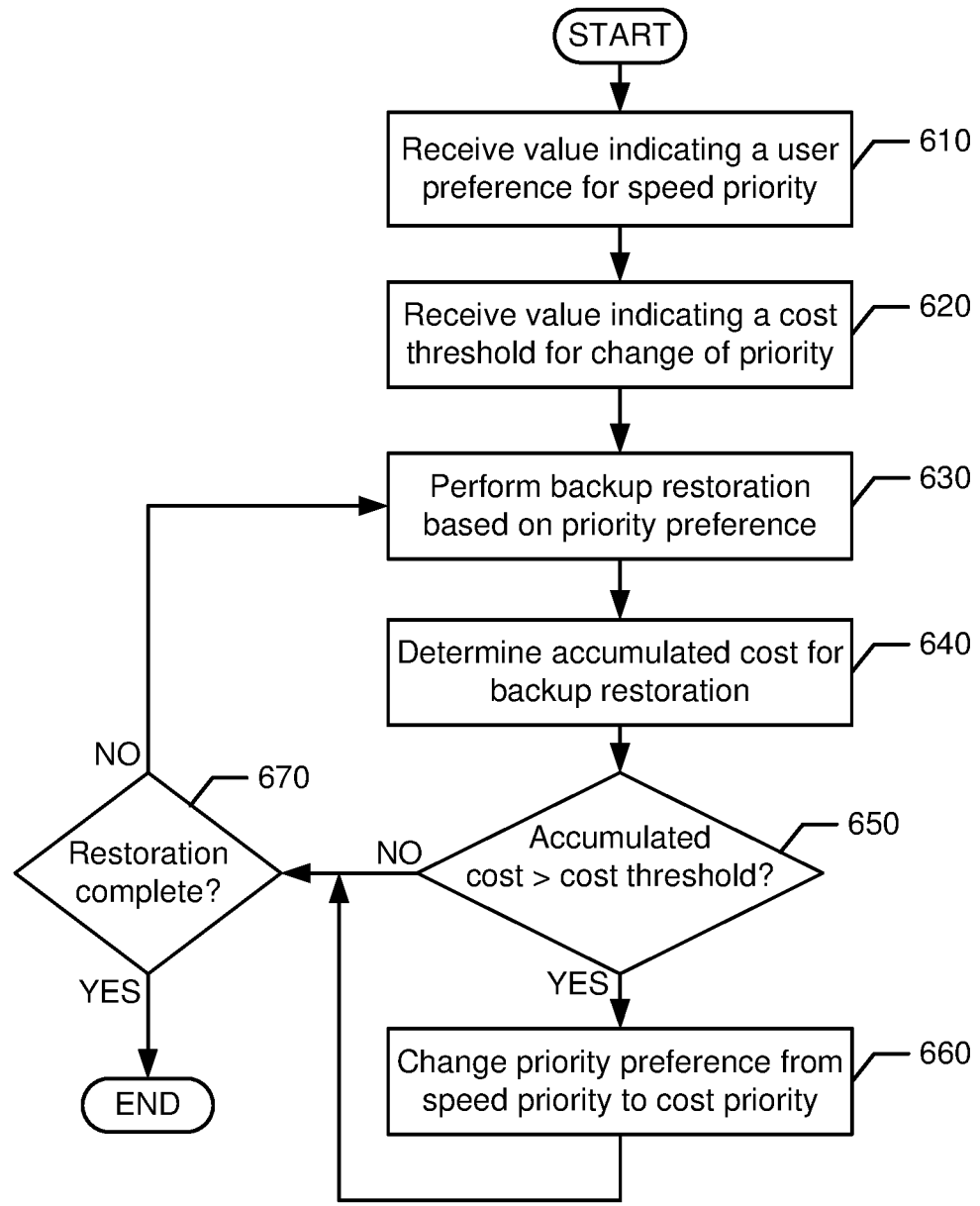
FIG. 6 is an illustration of an example process, in accordance with some implementations.

FIG. 6—Example Process for Backup Restoration

FIG. 6 shows is an example process 600 for backup restoration, in accordance with some implementations. The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIG. 1, which shows an example implementation. However, other implementations are also possible.

Referring to FIG. 6, block 610 may include receiving a value indicating a preference for speed priority. For example, referring to FIG. 1, the storage controller 142 reads or otherwise determines a first configuration setting that specifies a user preference for speed priority (i.e., prioritizing a faster completion time of the restoration over a lower financial cost of performing the restoration).

Referring again to FIG. 6, block 620 may include receiving a value indicating a cost threshold for a change of priority. Block 630 may include performing a backup restoration based on the priority preference. In some implementations, block 630 may include selecting a new restoration option at an initial time of a backup restoration (e.g., when initiating the backup restoration), or when detecting a change to the priority preference (e.g., as described below with reference to block 660). For example, referring to FIG. 1, the storage controller 142 reads or otherwise determines a second configuration setting that specifies a threshold level for the financial costs accumulated while performing a restoration from a remote storage system. In some implementations, the cost threshold may specify a level of accumulated financial cost at which a restoration process is to switch from using a speed priority to using a cost priority. The storage controller 142 selects an initial restoration option based at least on the user preference for a speed priority (e.g., based on the value received at block 610). For example, storage controller 142 may select the initial restoration option using the selection processes discussed above with reference to FIGS. 2-5B. The storage controller 142 then initiates and performs the backup restoration using the selected initial restoration option.

Referring again to FIG. 6, block 640 may include determining an accumulated cost for the backup restoration. Decision block 650 may include whether the accumulated cost has exceeded the cost threshold. If the accumulated cost has not exceeded the cost threshold ("NO"), the process 600 may continue at decision block 670 (described below). Otherwise, if the accumulated cost has exceeded the cost threshold ("YES"), the process 600 may continue at block 660, including changing the priority preference from a speed priority to a cost priority. In some implementations, block 660 is not performed if the priority preference is already set to a cost priority. The process 600 may then continue at decision block 670, including determining whether the backup restoration has been completed. If the backup restoration has been completed ("YES"), the process 600 is completed. Otherwise, if the backup restoration has not been completed ("NO"), the process 600 may return to block 630

(i.e., to continue performing the backup restoration based on the current priority preference).

For example, referring to FIG. 1, at least some backup data is transferred from the remote storage system 110 to the local storage system 100. These data transfers from the remote storage system 110 incur financial charges that are based on the amount of data being transferred. The storage controller 142 accumulates the cost of the financial charges for the data transfers from the remote storage system 110 performed during the backup restoration. If the accumulated cost exceeds the cost threshold, the storage controller 142 changes the priority preference from a speed priority to a cost priority. The storage controller 142 then selects a new restoration option based at least on the changed preference for cost priority, and then continues the backup restoration using the new restoration option. In this manner, some implementations may allow a user to cap or reduce the financial cost associated with restoring backup data from a remote storage system.

Figure 7:
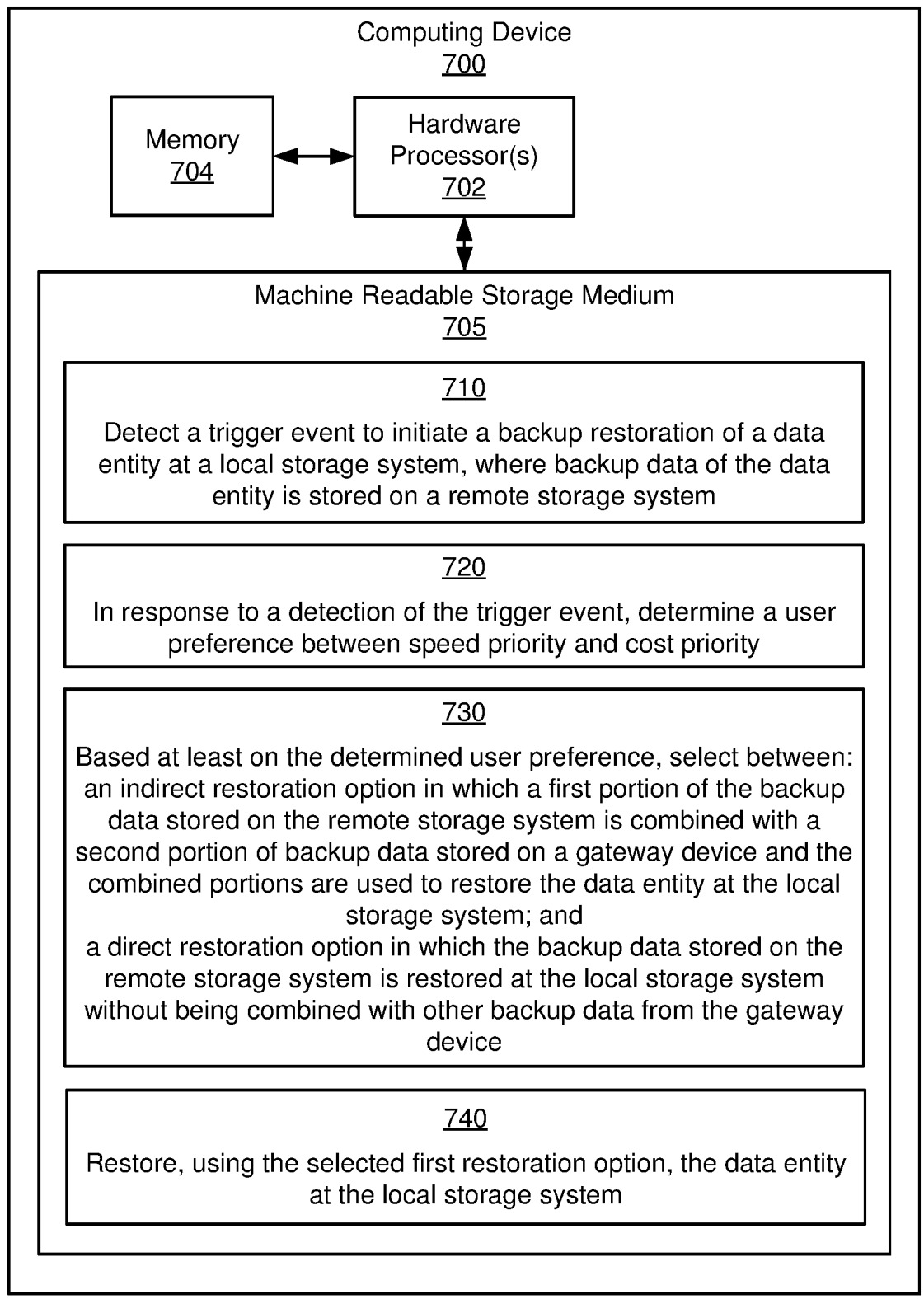
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to the host server 140 or another computing device included in the storage system 100 (shown in FIG. 1). As shown, the computing device 700 may include a hardware processor 702, a memory 704, and machine-readable storage 705 including instructions 710-740. The machine-readable storage 705 may be a non-transitory medium. The instructions 710-740 may be executed by the hardware processor 702, or by a processing engine included in hardware processor 702.

Instruction 710 may be executed to detect a trigger event to initiate a backup restoration of a data entity at a local storage system, where backup data of the data entity is stored on a remote storage system. Instruction 720 may be executed to, in response to a detection of the trigger event, determine a user preference between speed priority and cost priority. Instruction 730 may be executed to, based at least on the determined user preference, select between: an indirect restoration option in which a first portion of the backup data stored on the remote storage system is combined with a second portion of backup data stored on a gateway device and the combined portions are used to restore the data entity at the local storage system, and a direct restoration option in which the backup data stored on the remote storage system is restored at the local storage system without being combined with other backup data from the gateway device. Instruction 740 may be executed to restore, using the selected restoration option, the data entity at the local storage system.

For example, referring to FIGS. 1-3B, the storage controller 142 detects a failure event in the local storage system 100 that causes the loss of all or a portion of a data entity, and in response initiates a restoration of the data entity from the remote storage system 110. In another example, the storage controller 142 receives a backup restore request for a data entity stored on a remote storage system. In response to a determination of a user preference for speed priority over cost priority, the storage controller 142 computes an estimated time to complete a direct restoration option, computes an estimated time to complete an indirect restoration option, selects the restoration option having the shorter completion time, and uses the selected option to perform the restoration of the data entity. In some implementations, the direct restoration option may be one selected from a direct incremental restoration, a direct full restoration, and a direct sub-volume restoration. Further, the indirect restoration option may be one selected from an indirect incremental restoration, an indirect full restoration, and an indirect sub-volume restoration.

Figure 8:
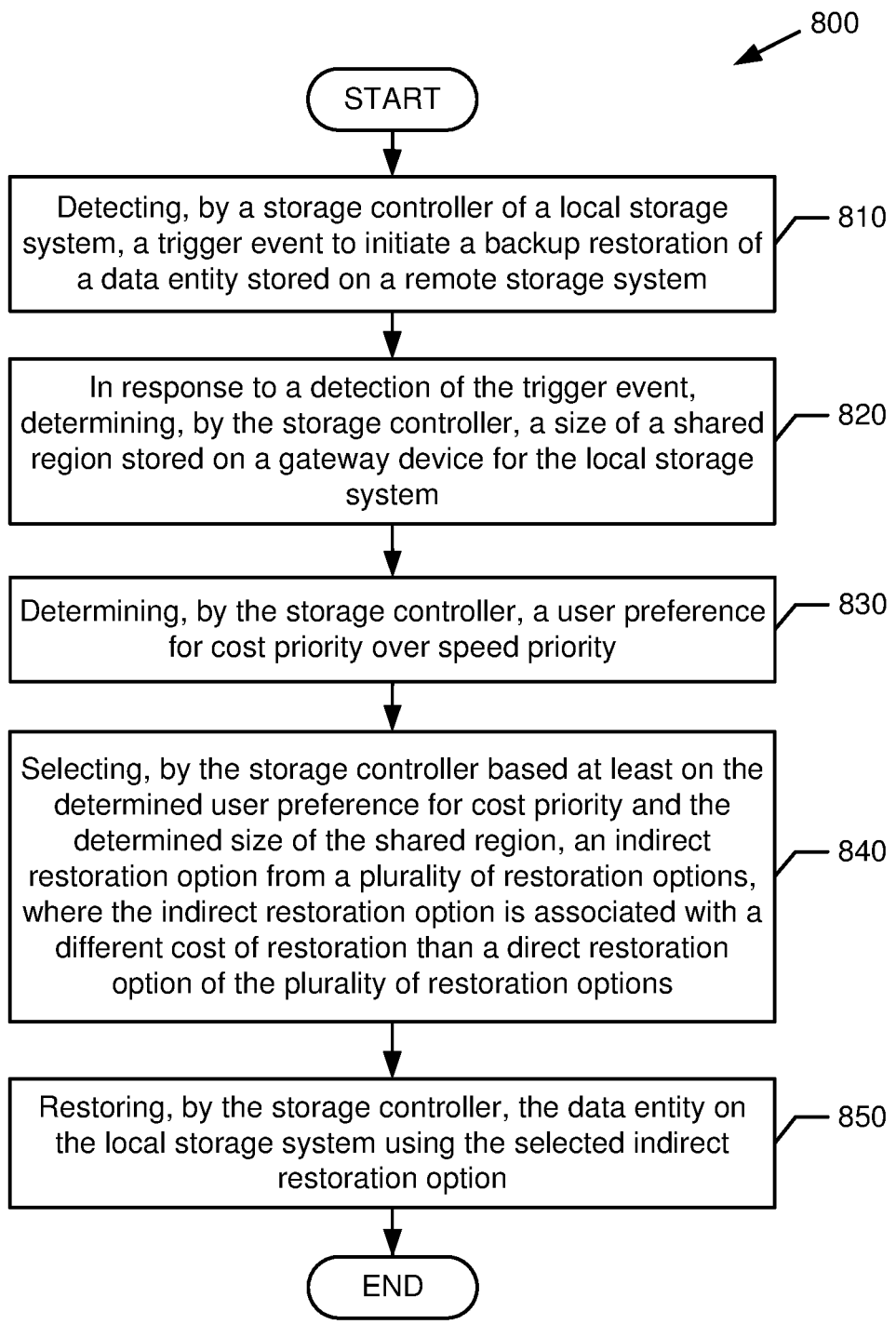
FIG. 8 is an illustration of an example process, in accordance with some implementations.

FIG. 8—Example Process

Referring now to FIG. 8, shown is an example process 800 in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1-3, which show examples in accordance with some implementations. However, other implementations are also possible.

Block 810 may include detecting, by a storage controller of a local storage system, a trigger event to initiate a backup restoration of a data entity stored on a remote storage system. Block 820 may include, in response to a detection of the trigger event, determining, by the storage controller, a size of a shared region stored on a gateway device for the local storage system. Block 830 may include determining, by the storage controller, a user preference for cost priority over speed priority. Block 840 may include selecting, by the storage controller based at least on the determined user preference for cost priority and the determined size of the shared region, an indirect restoration option from a plurality of restoration options, where the indirect restoration option is associated with a different cost of restoration than a direct restoration option of the plurality of restoration options. Block 850 may include restoring, by the storage controller, the data entity from the remote storage system using the selected indirect restoration option. After block 850, the process 800 may be completed.

For example, referring to FIGS. 1-3B, the storage controller 142 detects a failure event in the local storage system 100 that causes the loss of all or a portion of a data entity, and in response initiates a restoration of the data entity from the remote storage system 110. In another example, the storage controller 142 receives a backup restore request for a data entity stored on a remote storage system. In response to a determination of a user preference for cost priority over speed priority, the storage controller 142 determines whether the size of a shared region stored in a gateway device is greater than zero. The storage controller 142 selects a direct restoration option if the size of the shared region is not greater than zero, or selects an indirect restoration option if the size of the shared region is greater than zero. The storage controller 142 then uses the selected option to perform the restoration of the data entity. In some implementations, the direct restoration option may be one selected from a direct incremental restoration, a direct full restoration, and a direct sub-volume restoration. Further, the indirect restoration option may be one selected from an indirect incremental restoration, an indirect full restoration, and an indirect sub-volume restoration.

FIG. 9—Example Machine-Readable Medium

FIG. 9 shows a machine-readable medium 900 storing instructions 910-940, in accordance with some implementations. The instructions 910-940 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to detect a trigger event to initiate a backup restoration of a data entity at a local storage system, where backup data of the data entity is stored on a remote storage system. Instruction 920 may be executed to, in response to a detection of the trigger event, determine a user preference between speed priority and cost priority. Instruction 930 may be executed to, based at least on the determined user preference, select between: an indirect restoration option in which a first portion of the backup data stored on the remote storage system is combined with a second portion of backup data stored on a gateway device and the combined portions are used to restore the data entity at the local storage system, and a direct restoration option in which the backup data stored on the remote storage system is restored at the local storage system without being combined with other backup data from the gateway device. Instruction 940 may be executed to restore, using the selected restoration option, the data entity at the local storage system. In some implementations, the gateway device may be included in (or is otherwise associated with) the local storage system.

In accordance with implementations described herein, a local storage system may select one of multiple restoration options for transferring and restoring data from a remote storage system. The restoration option may be selected based on an evaluation of multiple input values, such as type of data entity to be restored, information about any portions or earlier copies of the desired data entity that may be stored in the local storage system, and a user preference between cost priority and speed priority. In some implementations, the local storage system may select the restoration option that can perform the restoration with a relatively low cost and an acceptable time of completion. In this manner, some implementations may improve the performance of the local storage system when restoring backup data from the remote storage system.

Note that, while FIGS. 1-9 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 142 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
a processor;
a memory; and
a machine-readable storage storing instructions, the instructions executable by the processor to:
  detect a trigger event to initiate a backup restoration of a data entity at a local storage system, wherein backup data of the data entity is stored on a remote storage system;
  in response to a detection of the trigger event, determine a user preference for one of speed priority and cost priority, wherein speed priority comprises a higher importance of completion speed over financial cost, and wherein cost priority comprises a higher importance of financial cost over completion speed;
  based at least on the determined user preference, select between:
    an indirect restoration option in which a first portion of the backup data stored on the remote storage system is combined with a second portion of backup data stored on a gateway device and the combined portions are used to restore the data entity at the local storage system, wherein the gateway device manages data transfers between the local storage system and the remote storage system, and wherein the data transfers between the local storage system and the remote storage system are transferred via the gateway device; and
    a direct restoration option in which the backup data stored on the remote storage system is restored at the local storage system without being combined with other backup data from the gateway device; and
  restore, using the selected restoration option, the data entity at the local storage system.

2. The computing device of claim 1, including instructions executable by the processor to:
in response to a determination that the data entity is a volume, determine whether incremental restoration can be performed for the data entity; and
in response to a determination that incremental restoration can be performed for the data entity, select a first incremental restoration option as the selected restoration option.

3. The computing device of claim 2, including instructions executable by the processor to, in response to a determination of a user preference for speed priority:
compute a first time T1 for completing a direct incremental restoration;

compute a second time T2 for completing an indirect incremental restoration; and in response to a determination that the second time T2 is greater than the first time T1, select a direct incremental restoration option as the selected restoration option.

4. The computing device of claim 3, including instructions executable by the processor to:

in response to a determination that the second time T2 is not greater than the first time T1, select an indirect incremental restoration option as the selected restoration option.

5. The computing device of claim 2, including instructions executable by the processor to:

in response to a determination that incremental restoration cannot be performed for the data entity, select a first full restoration option as the selected restoration option.

6. The computing device of claim 5, including instructions executable by the processor to, in response to a determination of a user preference for speed priority:

compute a third time T3 for completing a direct full restoration;

compute a fourth time T4 for completing an indirect full restoration; and in response to a determination that the fourth time T4 is greater than the third time T3, select a direct full restoration option as the selected restoration option.

7. The computing device of claim 6, including instructions executable by the processor to:

in response to a determination that the fourth time T4 is not greater than the third time T3, select an indirect full restoration option as the selected restoration option.

8. The computing device of claim 1, including instructions executable by the processor to:

in response to a determination that the data entity is not a volume, select a first sub-volume restoration option as the selected restoration option.

9. The computing device of claim 8, including instructions executable by the processor to, in response to a determination of a user preference for speed priority:

compute a fifth time T5 for completing a direct sub-volume restoration;

compute a sixth time T6 for completing an indirect sub-volume restoration; and in response to a determination that the sixth time T6 is greater than the fifth time T5, select a direct sub-volume restoration option as the selected restoration option.

10. The computing device of claim 9, including instructions executable by the processor to:

in response to a determination that the sixth time T6 is not greater than the fifth time T5, select an indirect sub-volume restoration option as the selected restoration option.

11. A method comprising detecting, by a storage controller of a local storage system, a trigger event to initiate a backup restoration of a data entity stored on a remote storage system;

in response to a detection of the trigger event, determining, by the storage controller, a size of a shared region stored on a gateway device for the local storage system, wherein the gateway device manages data transfers between the local storage system and the remote storage system, and wherein the data transfers between the local storage system and the remote storage system are transferred via the gateway device;

determining, by the storage controller, a user preference for cost priority over speed priority, wherein cost priority comprises a higher importance of financial cost over completion speed, and wherein speed priority comprises a higher importance of completion speed over financial cost;

selecting, by the storage controller based at least on the determined user preference for cost priority and the determined size of the shared region, an indirect restoration option from a plurality of restoration options, wherein the indirect restoration option includes a combination of a first portion of the backup data stored on the remote storage system with a second portion of backup data stored on a gateway device and the combined portions are used to restore the data entity at the local storage system, and wherein is associated with a different cost of restoration than a direct restoration option of the plurality of restoration options includes a restoration, at the local storage system, of the backup data stored on the remote storage system without being combined with other backup data from the gateway device; and restoring, by the storage controller, the data entity on the local storage system using the selected indirect restoration option.

12. The method of claim 11, further comprising:

determining whether the data entity is a volume; and in response to a determination that the data entity is a volume, determining whether incremental restoration can be performed for the data entity.

13. The method of claim 12, further comprising:

in response to a determination that incremental restoration can be performed for the data entity, determining a first set of data units in an incremental backup that are different from a plurality of data units in a full backup;

determining a first size S1 of a first shared region stored in the gateway device, wherein the first shared region comprises data units that are included in the first set of data units and are also stored in the gateway device;

determining whether the first size S1 is greater than zero;

in response to a determination that the first size S1 is not greater than zero, selecting a direct incremental restoration option; and in response to a determination that the first size S1 is greater than zero, selecting an indirect incremental restoration option.

14. The method of claim 12, further comprising:

in response to a determination that incremental restoration cannot be performed for the data entity, determining a second size S2 of a second shared region comprising data units that are included in both a full backup and a gateway backup, wherein the full backup is stored in the remote storage system, and wherein the gateway backup is stored in the gateway device;

determining whether the second size S2 is greater than zero;

in response to a determination that the second size S2 is not greater than zero, selecting a direct full restoration option; and in response to a determination that the second size S2 is greater than zero, selecting an indirect full restoration option.

15. The method of claim 12, further comprising:

in response to a determination that the data entity is not a volume, determining a third size S3 of a third shared region comprising data units that are included in both a sub-volume object and a gateway backup, wherein the sub-volume object is included in a volume backup stored in the remote storage system, and wherein the gateway backup is stored in the gateway device;

determining whether the third size S3 is greater than zero;

in response to a determination that the third size S3 is not greater than zero, selecting a direct sub-volume restoration option; and in response to a determination that the third size S3 is greater than zero, selecting an indirect sub-volume restoration option.

16. A non-transitory machine-readable medium storing instructions that upon execution cause a processor to:

detect a trigger event to initiate a backup restoration of a data entity at a local storage system, wherein backup data of the data entity is stored on a remote storage system;

in response to a detection of the trigger event, determine a user preference for one of speed priority and cost priority, wherein speed priority comprises a higher importance of completion speed over financial cost, and wherein cost priority comprises a higher importance of financial cost over completion speed;

based at least on the determined user preference, select between:

an indirect restoration option in which a first portion of the backup data stored on the remote storage system is combined with a second portion of backup data stored on a gateway device and the combined portions are used to restore the data entity at the local storage system, wherein the gateway device manages data transfers between the local storage system and the remote storage system, and wherein the data transfers between the local storage system and the remote storage system are transferred via the gateway device; and a direct restoration option in which the backup data stored on the remote storage system is restored at the local storage system without being combined with other backup data from the gateway device; and restore, using the selected first restoration option, the data entity at the local storage system.

17. The non-transitory machine-readable medium of claim 16, including instructions that upon execution cause the processor to:

in response to a determination that the data entity is a volume, determine whether incremental restoration can be performed for the data entity; and in response to a determination that incremental restoration can be performed for the data entity, select a first incremental restoration option, wherein the first incremental restoration option is the selected first restoration option.

18. The non-transitory machine-readable medium of claim 17, including instructions that upon execution cause the processor to:

in response to a determination that incremental restoration cannot be performed for the data entity, select a first full restoration option, wherein the first full restoration option is the selected first restoration option.

19. The non-transitory machine-readable medium of claim 16, including instructions that upon execution cause the processor to:

in response to a determination that the data entity is not a volume, select a first sub-volume restoration option, wherein the first sub-volume restoration option is the selected first restoration option.

20. The non-transitory machine-readable medium of claim 16, including instructions that upon execution cause the processor to:

determine, while restoring the data entity using the first restoration option, an accumulated cost of transfers from the remote storage system;

in response to a determination that the accumulated cost exceeds a cost threshold, select the second restoration option to replace the first restoration option; and restore the data entity using the selected second restoration option.

* * * * *